US010817367B2

(12) United States Patent
Darbari et al.

(10) Patent No.: US 10,817,367 B2
(45) Date of Patent: Oct. 27, 2020

(54) OUT-OF-BOUNDS RECOVERY CIRCUIT

(71) Applicant: Imagination Technologies Limited, Kings Langley (GB)

(72) Inventors: Ashish Darbari, Abbots Langley (GB); Iain Singleton, Hemel Hempstead (GB)

(73) Assignee: Imagination Technologies Limited, Kings Langley (GB)

( * ) Notice: Subject to any disclaimer, the term of this patent is extended or adjusted under 35 U.S.C. 154(b) by 327 days.

(21) Appl. No.: 15/784,746

(22) Filed: Oct. 16, 2017

(65) Prior Publication Data

US 2018/0107537 A1    Apr. 19, 2018

(30) Foreign Application Priority Data

Oct. 14, 2016  (GB) .................................. 1617530.9

(51) Int. Cl.
| | |
|---|---|
| *G06F 11/00* | (2006.01) |
| *G06F 11/07* | (2006.01) |
| *G06F 30/30* | (2020.01) |
| *G06F 30/392* | (2020.01) |
| *G06F 115/10* | (2020.01) |
| *G06F 117/06* | (2020.01) |

(52) U.S. Cl.
CPC ...... *G06F 11/0793* (2013.01); *G06F 11/0736* (2013.01); *G06F 11/0754* (2013.01); *G06F 30/30* (2020.01); *G06F 30/392* (2020.01); *G06F 2115/10* (2020.01); *G06F 2117/06* (2020.01)

(58) Field of Classification Search
CPC ............. G06F 11/0793; G06F 11/0736; G06F 11/0754
See application file for complete search history.

(56) References Cited

U.S. PATENT DOCUMENTS

| | | | | |
|---|---|---|---|---|
| 5,483,649 | A | * | 1/1996 | Kuznetsov ............ G06F 21/567 726/22 |
| 5,497,494 | A | * | 3/1996 | Combs ................ G06F 11/1441 713/323 |
| 5,758,174 | A | * | 5/1998 | Crump .................. G06F 1/3203 712/E9.032 |
| 5,765,001 | A | * | 6/1998 | Clark ........................ G06F 1/30 713/340 |

(Continued)

FOREIGN PATENT DOCUMENTS

| | | |
|---|---|---|
| EP | 1329787 A2 | 7/2003 |
| EP | 1912419 A1 | 4/2008 |

(Continued)

*Primary Examiner* — Jonathan D Gibson
(74) *Attorney, Agent, or Firm* — Potomac Law Group, PLLC; Vincent M DeLuca

(57) ABSTRACT

Out-of-bounds recovery circuits configured to detect an out-of-bounds violation in an electronic device, and cause the electronic device to transition to a predetermined safe state when an out-of-bounds violation is detected. The out-of-bounds recovery circuits include detection logic configured to detect that an out-of-bounds violation has occurred when a processing element of the electronic device has fetched an instruction from an unallowable memory address range for the current operating state of the electronic device; and transition logic configured to cause the electronic device to transition to a predetermined safe state when an out-of-bounds violation has been detected by the detection logic.

17 Claims, 5 Drawing Sheets

(56) References Cited

U.S. PATENT DOCUMENTS

| | | | | |
|---|---|---|---|---|
| 6,625,761 | B1* | 9/2003 | Sartore | G06F 11/0745 |
| | | | | 710/100 |
| 8,352,694 | B2* | 1/2013 | Heo | G06F 12/1491 |
| | | | | 711/147 |
| 2002/0051538 | A1* | 5/2002 | Kaplan | G06F 8/60 |
| | | | | 380/59 |
| 2008/0244206 | A1* | 10/2008 | Heo | G06F 12/145 |
| | | | | 711/163 |
| 2012/0221884 | A1* | 8/2012 | Carter | G06F 11/0772 |
| | | | | 714/2 |
| 2017/0003914 | A1* | 1/2017 | Gschwind | G06F 11/073 |
| 2017/0147356 | A1* | 5/2017 | Kotary | G06F 21/575 |
| 2017/0220404 | A1* | 8/2017 | Polar Seminario | G06F 8/654 |
| 2018/0107537 | A1* | 4/2018 | Darbari | G06F 11/0736 |

FOREIGN PATENT DOCUMENTS

| | | |
|---|---|---|
| EP | 2669807 A2 | 12/2013 |
| WO | 2005/116842 A2 | 12/2005 |
| WO | 2006/093618 A2 | 9/2006 |

* cited by examiner

OUT-OF-BOUNDS RECOVERY CIRCUIT

BACKGROUND

An electronic device comprising a processing element for processing computer executable instructions to control operation of the device can typically operate in one of one or more operating states. An operating state may be defined by the program or application that is being executed on the device or any other parameter or feature of the device. For example, a simple electronic device may operate in either a boot operating state where the processing element is executing a boot process, or a normal operating state where the processing element is executing an application or program.

Each operating state is typically associated with one or more blocks of memory which can be accessed while the electronic device is operating in that operating state. The memory block(s) associated with a particular operating state may be used to store executable instructions and/or data that allow the electronic device to operating in the particular state. For example, in the simple electronic device described above, the boot operating state may be associated with one or more blocks of BOOT read only memory (ROM) which are used to store executable instructions and/or data associated with the boot process; and the normal operating state may be associated with one or more blocks of random access memory (RAM) which are used to store executable instructions and/or data associated with the application or program.

If an electronic device is operating in a particular operating state and accesses memory that is not associated with the particular operating state then there has been an out-of-bounds memory access violation, which may be referred to herein as an out-of-bounds violation. For example, if the simple electronic device described above accesses the one or more blocks of RAM associated with the normal operating state during the boot process then there has been an out-of-bounds violation. Similarly, if the electronic device accesses the BOOT ROM after the boot process has completed then there has been an out-of-bounds violation.

An out-of-bounds violation may cause the electronic device to behave unpredictably since the accessed memory location does not contain known or expected data or content.

The embodiments described below are provided by way of example only and are not limiting of implementations which solve any or all of the disadvantages of known methods and systems for addressing out-of-bounds violations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described herein are out-of-bounds recovery circuits configured to detect an out-of-bounds violation in an electronic device, and cause the electronic device to transition to a predetermined safe state when an out-of-bounds violation is detected. The out-of-bounds recovery circuits include detection logic configured to detect that an out-of-bounds violation has occurred when the processing element has fetched an instruction from an unallowable memory address for the current operating state of the electronic device; and transition logic configured to cause the electronic device to transition to a safe state when an out-of-bounds violation has been detected by the detection logic.

A first aspect provides an out-of-bounds recovery circuit for an electronic device, the out-of-bounds recovery circuit comprising: detection logic configured to: monitor one or more control and/or data signals of the electronic device; and detect an out-of-bounds violation in the electronic device, when the detection logic determines, based on the one or more control and/or data signals of the electronic device, a processing element of the electronic device has fetched an instruction from a non-allowable memory address for a current operating state of the electronic device; and transition logic configured to, in response to the detection logic detecting an out-of-bounds violation, cause the electronic device to transition to a predetermined safe state.

A second aspect provides a method of recovering an electronic device from an out-of-bounds violation, the method comprising: monitoring, by an out-of-bounds recovery circuit, one or more control and/or data signals of the electronic device; detecting, by the out-of-bounds recovery circuit, an out-of-bounds violation in the electronic device when it is determined, from the one or more control and/or data signals of the electronic device, that a processing element of the electronic device has fetched an instruction from a non-allowable memory address for a current operating state of the electronic device; and in response to detecting an out-of-bounds violation, causing, by the out-of-bounds recovery circuit, the electronic device to transition to a predetermined safe state.

A third aspect provides an electronic device comprising a processing element and the out-of-bounds recovery circuit of the first aspect.

The out-of-bounds recovery circuit may be embodied in hardware on an integrated circuit. There may be provided a method of manufacturing, at an integrated circuit manufacturing system, an out-of-bounds recovery circuit. There may be provided an integrated circuit definition dataset that, when processed in an integrated circuit manufacturing system, configures the system to manufacture an out-of-bounds recovery circuit. There may be provided a non-transitory computer readable storage medium having stored thereon a computer readable description of an integrated circuit that, when processed, causes a layout processing system to generate a circuit layout description used in an integrated circuit manufacturing system to manufacture an out-of-bounds recovery circuit.

There may be provided an integrated circuit manufacturing system comprising: a non-transitory computer readable storage medium having stored thereon a computer readable integrated circuit description that describes the out-of-bounds recovery circuit; a layout processing system configured to process the integrated circuit description so as to generate a circuit layout description of an integrated circuit embodying the out-of-bounds recovery circuit; and an integrated circuit generation system configured to manufacture the out-of-bounds recovery circuit according to the circuit layout description.

There may be provided computer program code for performing a method as described herein. There may be provided non-transitory computer readable storage medium having stored thereon computer readable instructions that, when executed at a computer system, cause the computer system to perform the method as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings, in which.

Figure 1:
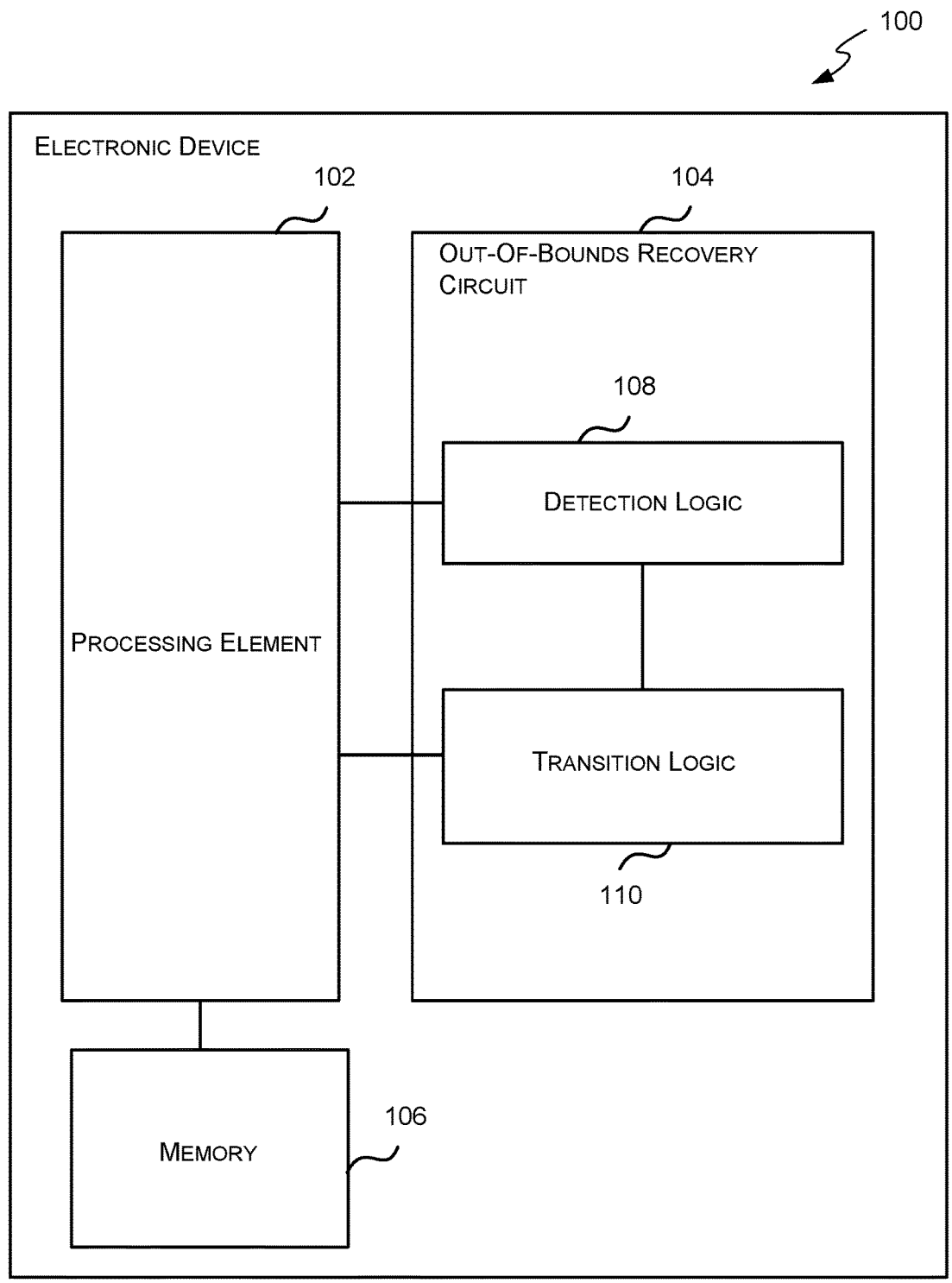
FIG. 1 is a block diagram of an example electronic system comprising a processing element and an out-of-bounds recovery circuit.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described above, out-of-bounds violations can cause the electronic device to behave unpredictably. In addition, some out-of-bounds violations can also pose a security threat to the electronic device. For example, if a hacker discovers that a processing element of the electronic device will/can fetch (and execute) an instruction from an out-of-bounds address the hacker could place malicious code at the out-of-bounds memory address to cause a rogue program to execute on the electronic device.

Such out-of-bounds violations may be caused by the software running on the device (e.g. an error or bug in the software, or, malicious code loaded onto the device by, for example, a hacker), or, by an error or bug in the hardware. For example, there may be an error or bug in the hardware that causes the hardware to incorrectly generate the address of the next instruction to be fetched from memory.

A method for identifying bugs or errors in a hardware design for an electronic device that will cause an out-of-bounds violation are described in the Applicant's co-pending patent application filed at the UK Intellectual Property office on the same day as the present application and entitled "DETECTING OUT-OF-BOUNDS VIOLATIONS IN A HARDWARE DESIGN USING FORMAL". However, while such methods can be used to ensure that there is not an error in the hardware of the electronic device that will cause an out-of-bounds violation, such methods do not protect the electronic device from an error or bug in the software or firmware run on the electronic device that causes an out-of-bounds violation in the electronic device. In other words, such a method does not protect the electronic device from security violations caused by the software or firmware itself.

Traditionally security has been considered a problem that is solved via software. For example, security of an electronic device is often implemented by anti-virus, anti-spyware, firewall and/or encryption software running on the electronic device (or another connected device). However, no matter how much care is exercised in developing and implementing the security measures some level of compromise may occur resulting in a security violation. Accordingly, a robust and resilient electronic device is one that not only attempts to prevent security violations, but can detect and isolate security violations and drive the system into a predetermined good state so that the electronic device can continue to operate after a security violation. For example, if there is an out-of-bounds violation caused by a Trojan (i.e. malicious code) in the firmware running on an electronic device a resilient electronic device is one that can detect the out-of-bounds violation and restore the electronic device to a predetermined good state.

Accordingly described herein are out-of-bounds recovery circuits configured to detect an out-of-bounds violation by an electronic device, and cause the electronic device to transition to a predetermined safe state when an out-of-bounds violation is detected The out-of-bounds recovery circuits include detection logic configured to detect an out-of-bounds violation by the electronic device when the processing element of the electronic device has fetched an instruction from an unallowable memory address for the current operating state of the electronic device; and transition logic configured to cause the electronic device to transition to a safe state when an out-of-bounds violation has been detected by the detection logic.

Detecting out-of-bounds violations in hardware, rather than software, allows the detection to be performed more efficiently. It also allows out-of-bounds violations caused by an error in the firmware (especially boot firmware) to be detected. In particular, security software, such as anti-virus programs, can generally only be invoked on an electronic device after the electronic device has completed its boot sequence thus any error or bug in the boot firmware may not be identified by any such security software that is invoked after the boot sequence.

Furthermore, the hardware cannot be modified after manufacture so the hardware (if designed correctly) is not subject to hacker attacks and thus will always be able to detect an out-of-bounds violation and put the electronic device in a state which enables the electronic device to recover from the violation. Thus an electronic device with an out-of-bounds recovery circuit will be more robust to security attacks.

Reference is now made to FIG. 1 which illustrates an example electronic device 100 with an out-of-bounds recovery circuit 104 for detecting out-of-bounds violations and transitioning the electronic device 100 to a predetermined safe state when an out-of-bounds violation is detected.

An electronic device 100 is any kind of device, machine, or dedicated circuit, or collection or portion therefore comprising one or more processing elements 102 that can execute computer-readable instructions stored in memory 106. Those skilled in the art will realize that such processing capabilities are incorporated into many different devices and therefore the term 'electronic device' includes set top boxes, media players, digital radios, PCs, servers, mobile telephones, personal digital assistants and many other devices.

Although the electronic device 100 of FIG. 1 comprises a single processing element 102, other electronic devices may comprise more than one processing element.

As is known to those of skill in the art, a processing element 102 fetches instructions from a program stored in memory 106, decodes the fetched instructions, executes the decoded instructions, and stores/commits the results of the executed instructions in memory and/or registers. The processing element 102 may be any kind of device, machine or dedicated circuit, or collection or portion thereof, with processing capability such that it can execute instructions. The processing element 102 may be a pipelined or un-pipelined processor, a single-threaded or multi-threaded processor, an in-order or out-of-order processor or any combination thereof.

A processing element may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc.

The memory 106 may be any technology suitable for storing computer readable instructions such as RAM, ROM, EPROM, EEPROM, flash memory, other memory technology, or any combination thereof. Although the memory 106 is shown within the electronic device 100 it will be appreciated that the memory 106 may be distributed or located remotely from the electronic device 100 and accessed by the electronic device 100 via a network or other communication link.

The electronic device 100 of FIG. 1 can operate in one or more operating states. Each operating state may be defined by the program or application that is being executed by the electronic device 100 or any other parameter or feature of the electronic device 100. The electronic device 100 may have one operating state or more than one operating state. For example, a simple electronic device, such as a power management unit (PMU) may be operable in one of two operating states: a boot operating state where, for example, the electronic device 100 is implementing a boot process; and a normal operating state where the electronic device 100 is executing one or more programs or applications. The electronic device 100 may initially operate in the boot operating state, and transition to the normal operating state after the boot process is complete.

Each operating state is associated with one or more blocks of memory 106 that the electronic device 100 is permitted to access while operating in that operating state. Such blocks of memory are referred to herein as allowable memory blocks for the particular operating state. The memory blocks that are not part of the allowable memory blocks for a particular operating state are referred to herein as the unallowable memory blocks for the particular operating state. Each block of memory is defined and accessible by a memory address range. The address range defining an allowable memory block will be referred to herein as an allowable memory address range and the address range defining an unallowable memory block will be referred to herein as an unallowable memory address range.

The allowable blocks of memory may be used to store executable instructions and/or data that allow the electronic device 100 to operate in that particular operating state. For example, the boot operating state may be associated with a special type of read only memory (ROM) referred to as BOOT ROM, whereas the normal operating state may be associated with another type of memory such as random access memory (RAM).

It is expected that while the electronic device 100 is operating in a particular state that the electronic device 100 will only access the allowable memory blocks for that operating state. However, as described above, there may be an error or bug in the software or firmware executed by the electronic device 100 that causes the electronic device 100 to access an unallowable memory block which is referred to herein as an out-of-bounds violation. One of the most significant out-of-bounds violations is loading an instruction from an unallowable memory block as it may allow a rogue program to execute on the electronic device 100.

The out-of-bounds recovery circuit 104 is configured to detect an out-of-bounds violation in the electronic device 100 and aid the electronic device 100 in recovering from the violation by causing, or forcing, the electronic device 100 to transition to a predetermined good state. The out-of-bounds recovery circuit 104 comprises detection logic 108 and transition logic 110.

The detection logic 108 is configured to monitor one or more control and/or data signals of the electronic device 100 to detect when an out-of-bounds violation has occurred. In particular, the detection logic 108 is configured to identify, from the one or more control and/or data signals, the current operating state of the electronic device 100, and detect an out-of-bounds violation when the detection logic 108 detects, from the one or more control and/or data signals, that the processing element 102 has fetched an instruction from an unallowable memory address for the current operating state.

The specific control signals and/or data signals that are monitored, and the status thereof indicating a particular operating state will vary depending on the configuration of the electronic device 100. For example, where the electronic device is a PMU that can operate in a boot operating state or a normal operating state the detection logic 108 may be configured to monitor a signal (e.g. a power_on_complete signal) that indicates when the boot process is complete to determine whether the PMU is in the boot operating state or the normal operating state. It will be evident that this is an example only and other control signals and/or data signals may be monitored to determine the current operating state of the electronic device 100.

Similarly the specific control and/or data signals that are monitored, and the status thereof indicating an instruction has been fetched from an unallowable memory address will vary depending on the configuration of the electronic device 100. For example, the detection logic 108 may be configured to monitor a signal which indicates the current value of the program counter of the processing element 102 and compare the current value of the program counter to an allowable address range and/or an unallowable address range to determine if the processing unit 102 has fetched an instruction from an unallowable memory address. Where the electronic device is a PMU that comprises an interpreter that acts as the processing element 102 to decode and execute instructions the signal indicating the current value of the program counter may be, for example, an address signal (e.g. pmu_addr).

The transition logic 110 is configured to (in response to the detection logic 108 detecting an out-of-bounds violation) cause the electronic device 100 to transition to a predetermined safe state. A predetermined safe state is a state that the out-of-bounds recovery circuit 104 knows has not been compromised and allows the electronic device 100 to continue operating. The specific predetermined safe state or states will depend on the specific electronic device 100 being monitored. For example, in some cases the transition logic 110 may be configured to cause the electronic device 100 to transition to a predetermined state by causing the processing element 102 of the electronic device 100 to transition into an idle state or a post-reset state.

The transition logic 110 may be configured to cause the processing element 102 to transition to the predetermined safe state in any known manner. In some cases the processing element 102 of the electronic device 100 may comprise a state tracking mechanism for tracking the state of the processing element 102. For example, the state tracking mechanism may be a state machine which uses (signal, value) pairs to move the state machine into different states. In these cases the transition logic 110 may be configured to cause the processing element 102 to transition to a particular state by setting a particular signal to a predetermined value.

For example, where the electronic device 100 is a PMU the processing element (e.g. interpreter) 102 may comprise a state machine which is moved into the PMU's next assigned state each cycle. However, if an out-of-bounds violation is detected, the transition logic 110 may be configured to override the assigned state by causing the state machine to move into, for example, an IDLE state where the processing element (e.g. interpreter) 102 awaits further external interaction.

In other cases the transition logic 110 may be configured to cause the electronic device 100 to transition to a predetermined safe state by causing an interrupt to invoke a particular exception handler. In yet other cases the transition logic 110 may be configured to cause the electronic device 100 to transition to a predetermined safe state by forcing the processing element 103 of the electronic device 100 into a predetermined state and causing an interrupt to invoke a particular exception handler.

Although the out-of-bounds recovery circuit 104 is shown in FIG. 1 as being within (or part of) the electronic device 100 it will be appreciated that the out-of-bounds recovery circuit 104 may be external to, but connected or coupled to, the electronic device 100.

An example implementation of the out-of-bounds recovery circuit 104 will be described below with reference to FIG. 3.

In some cases, the out-of-bounds recovery circuits 104 and 304 described herein may be integrated into the design of the electronic device 100 so that when the electronic device 100 is manufactured the out-of-bounds recovery circuit 104 forms part of the electronic device 100. For example, if the electronic device 100 is implemented in a hardware design and the out-of-bounds recovery circuit 104 is implemented in a hardware design, the hardware design for the out-of-bounds recovery circuit 104 or 304 may be integrated into the hardware design for the electronic device 100, or, the hardware design for the out-of-bounds recovery circuit 104 or 304 may be bound to the hardware design for the electronic device 100.

The term "hardware design", which may also be referred to as an integrated circuit definition dataset, is used herein to refer to a description of the structure and function of an integrated circuit which when processed at an integrated circuit manufacturing system causes the integrated circuit manufacturing system to generate an integrated circuit described by the hardware design. For example, as described in more detail below with respect to FIG. 5, when a hardware design is processed at an integrated circuit manufacturing system the integrated circuit manufacturing system may generate the integrated circuit by synthesizing the hardware design into silicon, or, by loading configuration data into a field-programmable gate array (FPGA).

A hardware design may be implemented in a high level hardware description language (HDL), such as, but not limited to, a register transfer level (RTL) language. Examples of register transfer level languages include, but are not limited to, VHDL (VHSIC Hardware Description Language) and Verilog. It will be evident to a person of skill in the art that other high level hardware description languages may be used such as proprietary high level hardware description languages.

Figure 2:
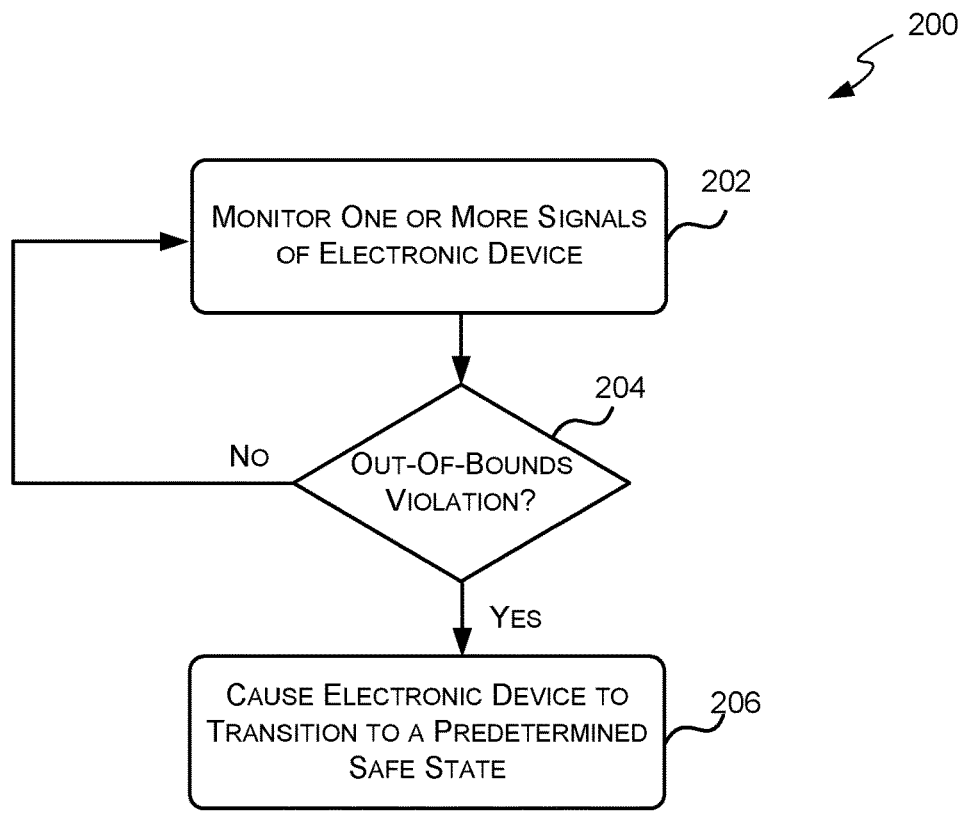
FIG. 2 is a flow diagram of an example method for detecting, and recovering from, an out-of-bounds violation using the out-of-bounds recovery circuit of FIG. 1.

Reference is now made to FIG. 2 which illustrates an example method 200 for detecting, and recovering from, an out-of-bounds violation in an electronic device 100 which may be implemented by the out-of-bounds recovery circuit 104 of FIG. 1.

The method 200 begins at block 202 where the detection logic 108 of the out-of-bounds recovery circuit 104 monitors one or more relevant control and/or data signals of the electronic device 100. Monitoring the one or more relevant controls signals may comprise sampling some or all of the relevant control signals over one or more clock cycles. As described above, the relevant control signals that are monitored will depend on the electronic device 100 being monitored.

At block 204, the detection logic 108 determines, based on the status of the monitored control and/or data signal(s), whether an out-of-bounds violation has occurred in the electronic device. In particular, the detection logic 108 determines based on the status of the monitored control and/or data signals(s) whether the processing element 102 of the electronic device 100 has fetched an instruction from an unallowable memory address for the current operating state of the electronic device 100.

As described above, in some cases the detection logic 108 may be configured to identify the current operating state from the monitored control and/or data signal(s) and then determine if there has been an out-of-bounds violation by comparing the program counter of the processing element 102 to the allowable and/or unallowable memory address ranges for the current operating state to determine if the electronic device 100 has fetched an instruction from an unallowable memory address for the current operating state.

If the detection logic 108 determines that the electronic device 100 has fetched an instruction from an unallowable memory address (and thus an out-of-bounds violation has occurred) the method 200 proceeds to block 206. If, however, the detection logic 108 does not determine that the electronic device 100 has fetched an instruction from an unallowable memory address, the method 200 proceeds back to block 202 where the detection logic 108 continues to monitor the one or more relevant control signals.

At block 206, once the detection logic 108 has detected a fetch of an instruction from an unallowable memory address (and thus an out-of-bounds violation has occurred) the transition logic 110 causes the electronic device 100 to transition to a predetermined safe state. As described above, a predetermined safe state is any state of the electronic device 100 in which the electronic device 100 should not be able to make a transition to an unsafe state. In particular, once the electronic device 100 is in a safe state it is expected that the electronic device 100 will transition to states that are expected are aligned with the normal functioning of the electronic device 100. For example, the transition logic 110 may cause the electronic device to transition to a predetermined safe state by causing the processing element 102 of the electronic device 100 to transition to an IDLE state. The IDLE state is considered a safe state because once the processing element 102 is in the IDLE state the processing element 102 can only make transitions to well defined states that are expected in the normal execution of the electronic device 100. Once the transition logic 110 has caused the electronic device 100 to transition to a predetermined safe state the method 200 may end or the method 200 may return to block 202 where the detection logic 108 continues to monitor the relevant control signals.

Figure 3:
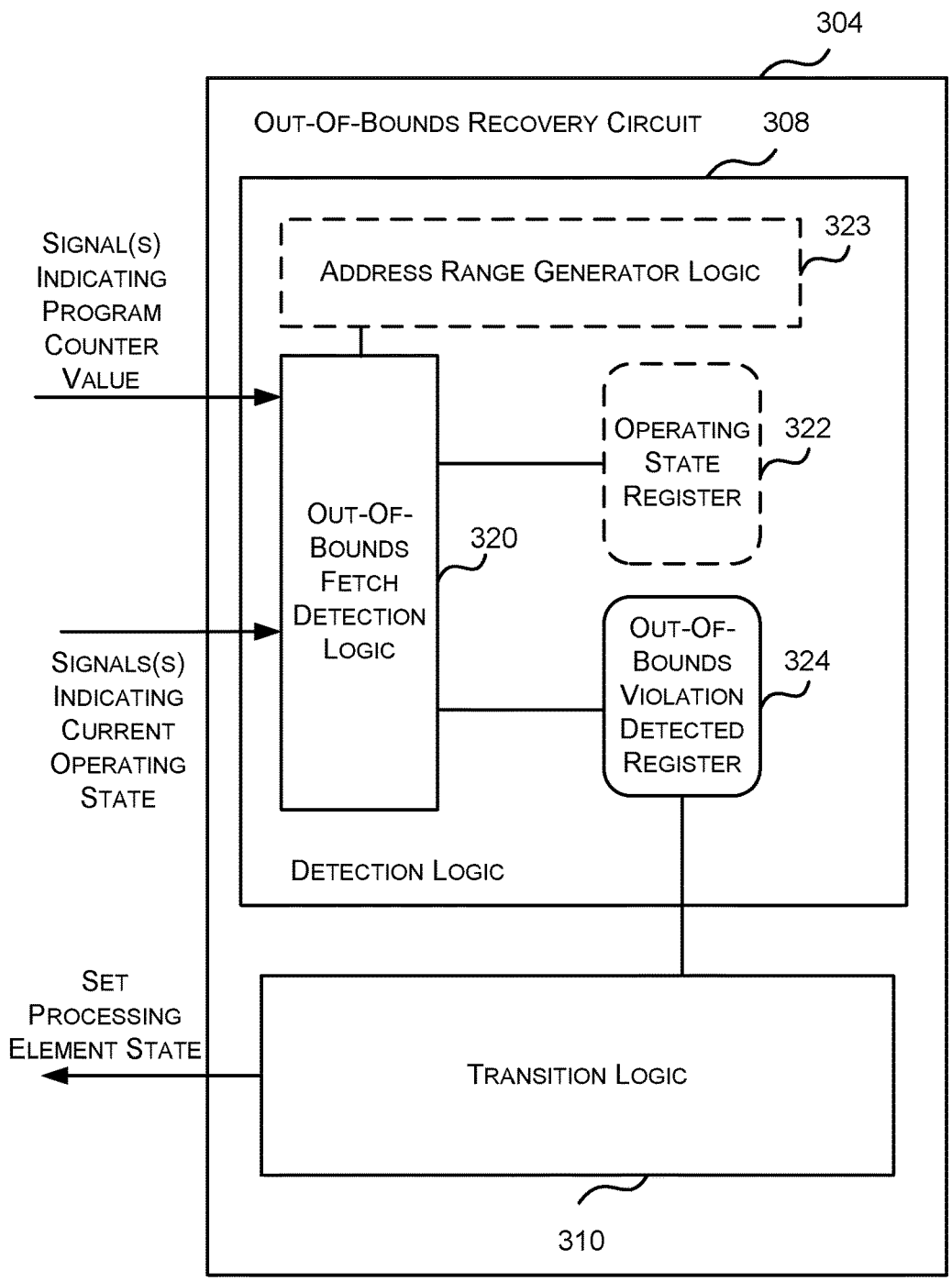
FIG. 3 is a block diagram of an example out-of-bounds recovery circuit.

Reference is now made to FIG. 3 which illustrates an example implementation of an out-of-bounds recovery circuit 304, which may be used as the out-of-bounds recovery circuit 104 of FIG. 1 for detecting, and recovering from an out-of-bounds violation in an electronic device 100. The out-of-bounds recovery circuit 304 of FIG. 3 detects an out-of-bounds violation in the electronic device 100 when the processing element 102 of the electronic device 100 fetches an instruction from an unallowable memory address.

The out-of-bounds recovery circuit 304 comprises detection logic 308 for detecting when an out-of-bounds violation has occurred in the electronic device 100 and transition logic 310 for causing the electronic device 100 to transition to a predetermined safe state.

The detection logic 308 is configured to detect that an out-of-bounds violation has occurred in the electronic device 100 when the processing element 102 of the electronic device 100 has fetched an instruction from an unallowable memory address. The detection logic 308 comprises out-of-bounds fetch detection logic 320 which monitors one or more control and/or data signals of the electronic device 100 that indicate the current operating state of the electronic device 100 to identify the current operating state of the electronic device.

For example, where the electronic device 100 is a PMU that initially operates in a boot operating state where the electronic device is implementing a boot process, and once the boot process is complete operates in a normal operating state where the electronic device 100 is executing one or more programs or applications, the detection logic 308 may be configured to monitor a signal (e.g. a power_on_complete signal) that indicates whether or not the electronic device 100 has completed the boot process. If the signal indicates that the electronic device 100 has not completed the boot process then the detection logic identifies that the PMU is in the boot operating state, and if the electronic device 100 has completed the boot process then the out-of-bounds fetch detection logic 320 identifies that the PMU is in the normal operating state.

In some cases, as shown in FIG. 3, the out-of-bounds fetch detection logic 320 may be configured to store in a storage unit, such as a register or flag, information indicating the identified current operating state of the electronic device 100. For example, in the PMU example, the detection logic 308 may comprise an operating state register 322 and the out-of-bounds fetch detection logic 320 may be configured to set the operating state register 322 (e.g. to a "1" or "true" value) when the out-of-bounds fetch detection logic 320 identifies that the electronic device 100 is currently operating in the boot operating state, and clear the operating state register 322 (e.g. to a "0" or false value) when out-of-bounds fetch detection logic 320 identifies that the electronic device 100 is currently operating in the normal operating state. The information stored in the storage unit (such as operating state register 322) may then be used to determine the current operating state for the purpose of identifying the allowable and unallowable memory address range(s). In other cases, the out-of-bounds fetch detection logic may use the signal(s) indicating the current operating state directly for the purpose of identifying the allowable and unallowable memory address ranges.

The out-of-bounds fetch detection logic 320 also monitors one or more control signals that indicate the current value of the processing element's program counter to determine the memory address of a fetched instruction. As is known to those of skill in the art, the program counter (PC) of a processing element tells the processing element where in memory to fetch the next instruction for execution from. In particular, the PC typically indicates an address in memory from which the next instruction should be fetched. Then when the processing element is in the fetch state the processing element fetches an instruction from the address in memory pointed to by the PC.

The out-of-bounds fetch detection logic 320 is configured to compare the value of the program counter to allowable and/or unallowable memory address ranges associated with the current operating state to determine if the processing element 102 of the electronic device 100 has fetched an instruction from an unallowable memory address. Generally if the value of the program counter falls within an allowable memory address range for the current operating state then the processing element 102 has fetched an instruction from an allowable memory address range, and, conversely if the value of the program counter falls outside the allowable memory address range(s) for the current operating state (i.e. the value of the program counter falls within an unallowable memory address range for the current operating state) then the processing element has fetched an instruction from an unallowable memory address range and thus an out-of-bounds violation has occurred.

For example, if the electronic device has a first operating state that has an allowable address range from address A to address B, and a second operating state that has an allowable address range from address C to address D then the out-of-bounds fetch detection logic 320 may be configured to compare the value of the program counter to the allowable address range defined by address A and address B, or the allowable address range defined by address C and address D based on the current operating state of the electronic device 100 (as determined from the operating state register 322, or as determined directly from the one or more control and/or data signals indicating the current operating state of the electronic device 100). If the value of the program counter falls within the allowable memory address range associated with the current operating state then the processing element 102 has fetched an instruction from an allowable memory address. In contrast, if the value of the program counter does not fall within an allowable memory address range associated with the current operating state then the processing element 102 has fetched an instruction from an unallowable memory address and thus there has been an out-of-bounds violation.

In some cases, the allowable address range(s) (and/or unallowable address range(s)) associated with each operating state may be hard-coded into the out-of-bounds fetch detection logic 320. In other cases, the detection logic 308 may comprise address range generator logic 323 which is configured to generate the allowable and/or unallowable address range(s) associated with each operating state based on one or more input parameters.

For example, where the electronic device 100 is a PMU that is operable in a boot operating state and a normal operating state and the boot operating state is associated with BOOT ROM and the normal operating state is associated with a block of RAM, and the addresses allocated to the RAM follow the addresses allocated to the BOOT ROM, the address range generator logic 323 may be configured to generate the memory address ranges for the boot operating state and the normal operating state based on the base address for the BOOT ROM, the size of the BOOT ROM and the size of the block of RAM. The following is example code to determine the top and bottom of the address ranges for the BOOT ROM and the relevant block of RAM:

BOTTOM_ADDR_BOOT_ROM=BOOT_ROM_BASE_ADDRESS;

TOP_ADDR_BOOT_ROM=BOOT_ROM_BASE_ADDRESS+BOOT_ROM_SIZE;

BOTTOM_ADDR_RAM=BOOT_ROM_BASE_ADDRESS+BOOT_ROM_SIZE+ONE_ADDRESS;

TOP_ADDR_RAM=BOOT_ROM_BASE_ADDRESS+BOOT_ROM_SIZE+RAM_SIZE;

If the out-of-bounds fetch detection logic 320 determines that an out-of-bounds violation has occurred then the out-of-bounds fetch detection logic 320 generates an indication that an out-of-bounds violation has been detected. In the example of FIG. 3 the out-of-bounds fetch detection logic 320 is configured to set an out-of-bounds violation detected register 324 to indicate that an out-of-bounds violation has been detected. However, in other examples the out-of-bounds fetch detection logic 320 may generate a signal that indicates an out-of-bounds violation has been detected.

The transition logic 310 is configured to (upon determining that the detection logic 308 has detected that an out-of-bounds violation has occurred in the electronic device 100) cause the electronic device 100 to transition to a predetermined safe state. In some cases, the transition logic 310 is configured to determine that the detection logic 308 has detected an out-of-bounds violation based on the status of the out-of-bounds violation detected register 324. For example, in some cases the transition logic 310 is configured to determine that the detection logic 308 has detected an out-of-bounds violation when the out-of-bounds violation detected register 324 is set and to determine that the detection logic 308 has not detected an out-of-bounds violation otherwise.

Once the transition logic 310 has determined that the detection logic 308 has detected an out-of-bounds violation the transition logic 310 causes the electronic device 100 to transition to a safe state. In the example shown in FIG. 3 the transition logic 310 is configured to cause the electronic device 100 to transition to a safe state by putting the processing element 102 in a particular state (e.g. IDLE state).

As described above, in some cases the processing element 102 may comprise a state tracking mechanism for tracking the state of the processing element 102. For example, the state tracking mechanism may be a state machine which uses (signal, value) pairs to move the state machine into different states. In these cases, the transition logic 310 may be configured to cause the processing element 102 to transition to a particular state by setting a particular signal to a predetermined value.

For example, where the electronic device 100 is a PMU the processing element (e.g. interpreter) 102 may comprise a state machine which is moved into the PMU's next assigned state each cycle. However, if an out-of-bounds violation is detected, the transition logic 310 may be configured to override the assigned state by causing the state machine to move into, for example, an IDLE state where the processing element (e.g. interpreter) 102 awaits further external interaction.

In some cases, causing the processing element 102 to transition to an IDLE state may also include clearing and/or setting one or more registers to ensure that the processing element 102 can start processing instructions from a known point.

It will be evident to a person of skill in the art that this is an example only and the transition logic 310 may be configured to cause the electronic device 100 to transition to another predetermined safe state and/or in another manner. For example, in other cases the transition logic 310 may be configured to invoke an interrupt (e.g. by driving an interrupt line) to cause the processing element to execute a particular exception handler.

The transition logic 310 may also be configured to set the current fetch to invalid (e.g. by setting a flag) so that the processing element does not execute the instruction fetched from the out-of-bounds address.

Although, not shown in FIG. 3, it will be evident to a person of skill in the art that the logic blocks (e.g. out-of-bounds fetch detection logic 320, address range generator logic 323, and transition logic 310) may be triggered by a clock. For example, one or more of the logic blocks may be triggered by the rising or positive edge of the clock. Furthermore, it will be evident to a person of skill in the art that one or more of the logic blocks (e.g. out-of-bounds fetch detection logic 320, address range generator logic 323, and transition logic 310) may be combined or their functionality may be divided between logic blocks in another manner.

Figure 4:
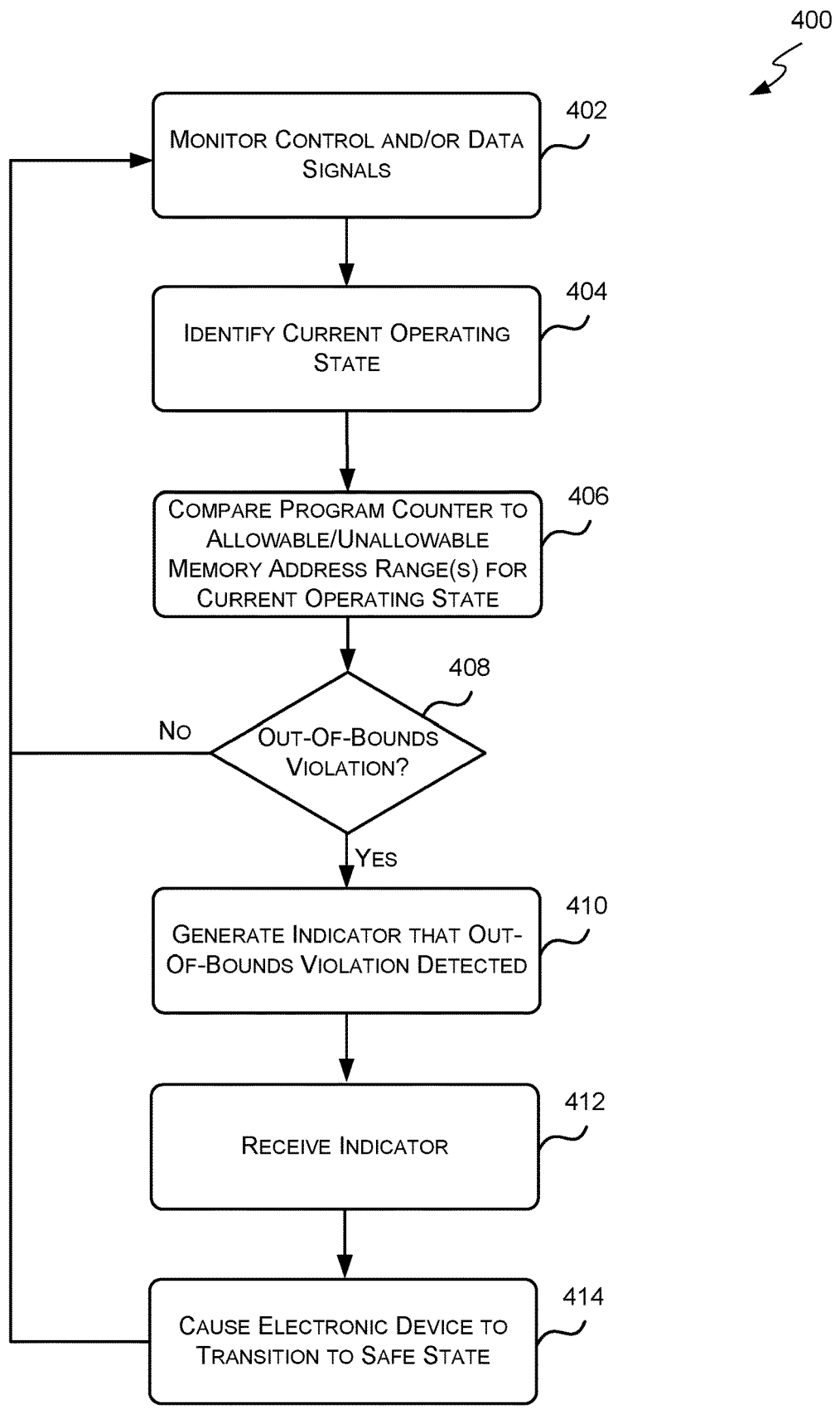
FIG. 4 is a flow diagram of an example method for detecting, and recovering from, an out-of-bounds violation using the out-of-bounds recovery circuit of FIG. 3.

Reference is now made to FIG. 4 which illustrates an example method 400 for detecting, and recovering from, an out-of-bounds violation in an electronic device 100 which may be implemented by the out-of-bounds recovery circuit 304 of FIG. 3. The method 400 detects that an out-of-bounds violation has occurred in the electronic device 100 if the processing element 102 of the electronic device 100 has fetched an instruction from an unallowable memory address.

The method 400 begins at block 402 where the out-of-bounds fetch detection logic 320 monitors one or more control and/or data signals of the electronic device 100 that indicate the current operating state of the electronic device 100, and one or more control and/or data signals that indicate the value of the program counter for the electronic device's processing element 102. Monitoring the one or more control and/or data signals may comprise periodically sampling the one or more control and/or data signals. The specific control and/or data signals that are monitored are dependent on the configuration of the particular electronic device 100 being monitored. The method 400 then proceeds to block 404.

At block 404, the out-of-bounds fetch detection logic 320 identifies, from the monitored control and/or data signal(s), the current operating state of the electronic device 100. For example, as described above, where the out-of-bounds fetch detection logic 320 is configured to monitor a signal (e.g. a power_on_complete signal) that indicates whether the power on process is complete, the out-of-bounds fetch detection logic 320 may be configured to identify that the electronic device 100 (e.g. PMU) is in a first operating state (e.g. boot operating state) when the monitored signal indicates that the power on process is not complete, and to identify that the electronic device 100 (e.g. PMU) is in a second operating state (e.g. normal operating state) when the monitored signal indicates that the power on process is complete.

As described above, in some cases the out-of-bounds fetch detection logic 320 may store the results of the identification in a storage module, such as, but not limited to a register (e.g. operating state register 322). For example, the out-of-bounds fetch detection logic 320 may store a value in the storage module that indicates the results of the identification.

Once the out-of-bounds fetch detection logic 320 has identified the current operating state of the electronic device 100 the method 400 proceeds to block 406.

At block 406, the out-of-bounds fetch detection logic 320 compares the value of the program counter of the processing element 102 of the electronic device 100, based on the monitored control and/or data signal(s), to allowable address range(s) and/or unallowable address range(s) for the identified operating state to determine if the processing element 102 has fetched an instruction from an unallowable memory address.

For example, if the electronic device has a first operating state that has an allowable address range from address A to address B, and a second operating state that has an allowable address range from address C to address D, then if the out-of-bounds fetch detection logic 320 has detected that the electronic device 100 is operating in the first operating state then the out-of-bounds fetch detection logic 320 may compare the value of the program counter to the allowable address range defined by address A and address B, and if the out-of-bounds fetch detection logic 320 has detected that the electronic device 100 is operating in the second operating state then the out-of-bounds fetch detection logic 320 may compare the value of the program counter to the allowable address range defined by address C and address D.

Once the value of the program counter has been compared to the allowable and/or unallowable memory address range(s) associated with the operating state identified in block 404 the method 400 proceeds to block 408.

At block 408, the out-of-bounds fetch detection logic 320, based on the comparison, determines whether the processing element 102 of the electronic device 100 has fetched an instruction from an unallowable memory address thus indicating an out-of-bounds violation. In particular, if the value of the program counter falls within at least one allowable memory address range associated with the current operating state of the electronic device 100 then the processing element 102 has fetched an instruction from an allowable memory address. In contrast, if the value of the program counter does not fall within at least one allowable memory address range associated with the current operating state of the electronic device 100 then the processing element 102 has fetched an instruction from an unallowable memory address and there has been an out-of-bounds violation.

If the out-of-bounds fetch detection logic 320 has determined that the electronic device 100 has fetched an instruction from an unallowable memory address (indicating that there has been an out-of-bounds violation) the method 400 proceeds to block 410. In contrast, if the out-of-bounds fetch detection logic 320 has determined that the electronic device 100 has fetched an instruction from an allowable memory address the method 400 proceeds back to block 402 where the out-of-bounds fetch detection logic 320 continues to monitor the one or more control and/or data signals.

At block 410, upon detecting an out-of-bounds violation, the out-of-bounds fetch detection logic 320 generates an indicator that an out-of-bounds violation has been detected.

In some cases, the out-of-bounds fetch detection logic 320 may set a register, such as the out-of-bounds violation detected register 324, to indicate that an out-of-bounds violation has been detected. In other cases, the out-of-bounds fetch detection logic 320 may output an out-of-bounds violation detected signal indicating that an out-of-bounds violation has been detected. Once the out-of-bounds fetch detection logic 320 has generated the indicator that an out-of-bounds violation has been detected, the method 400 proceeds to block 412.

At block 412, the transition logic 310 receives the indicator generated by the out-of-bounds fetch detection logic 320 that an out-of-bounds violation has been detected. For example, the transition logic 310 may read the value of the out-of-bounds violation detected register 324, or the transition logic 310 may receive the generated out-of-bounds detected signal. Once the transition logic 310 has received the indicator that an out-of-bounds violation has been detected, the method 400 proceeds to block 414.

At block 414, the transition logic 310 causes the electronic device 100 to transition to a predetermined safe state. In some cases, the transition logic 100 may cause the electronic device 100 to transition to a predetermined safe state by setting the processing element 102 of the electronic device 100 to a predetermined state (e.g. an idle state). In other cases, the transition logic 310 may cause the electronic device 100 to transition to a predetermined safe state by invoking an interrupt (e.g. by driving an interrupt line) to cause the processing element 102 to execute a particular exception handler. However, it will be evident to a person of skill in the art that these are examples only and the transition logic 310 may cause the electronic device 100 to transition to another predetermined safe state and/or in another manner.

In some cases, as part of transitioning the electronic device 100 to a predetermined safe state, or in addition to transitioning the electronic device 100 to a predetermined safe state, the transition logic may configure or set one or more signals and/or parameters of the electronic device 100 to ensure safe operation. For example, in some cases the transition logic 100 may set the current fetch to invalid (e.g. by setting a flag) so that the processing element 102 does not execute the instruction fetched from the out-of-bounds memory address.

The following is example code for implementing transition logic 310 which is configured to transition a PMU to a predetermined safe state upon detecting fetch of an instruction by the instruction interpreter (i.e. processor) of the PMU from an out-of-bounds memory address for the current operating state of the PMU by (i) raising an interrupt; (ii) disabling a number of valid signals; and (ii) setting the current state of the instruction interpreter (i.e. processor of the PMU) to IDLE.

In particular, in this example, out_of_bound is the out-of-bounds violation detected register 324 which is set to "1" when the out-of-bounds fetch detection logic 320 detects an out-of-bounds violation; pmu_memory_out_of_ram_irq is a PMU interrupt line which is set to "1" (raising an interrupt) when an out-of-bounds violation is detected.

The pmu_ad_val signal is a PMU signal that indicates that the program counter has valid data (i.e. that the address is valid). When the out-of-bounds fetch detection logic 320 does not detect an out-of-bounds violation the value of this signal is stored in a pmu_safe_ad_val register otherwise the pmu_safe_ad_val register is set to 0. In other words, pmu_safe_ad_val is set to the pmu_ad_val value when there has not been an out-of-bounds violation, and otherwise the pmu_safe_ad_val is set to '0'. Accordingly, pmu_safe_ad_val indicates whether the program counter has valid data AND safe data.

The pmu_maon_ad_val is a PMU signal that controls communication to the PMU always on domain, and the pmu_soc_ad_val is a PMU signal that sends data to the network on chip (NoC) fabric. Both of these signals are set to the pmu_safe_ad_val value.

```
pmu_memory_out_of_ram_irq <=   '1'
    when (out_of_bound = '1') else '0';
pmu_safe_ad_val <= pmu_ad_val when (out_of_bound = '0')
    else '0';
pmu_maon_ad_val   <= pmu_safe_ad_val
pmu_soc_ad_val    <= pmu_safe_ad_val
pmu_state_proc : process (clk, resetn)
    begin
        if (resetn = '0') then
            pmu_current_state <= pmu_reset;
        elsif (clk'event and clk = '1') then
            if ((out_of_bound = '1')) then
                pmu_current_state <= pmu_idle;
                r_ext_inst_address    <= (others => '0');
                external_execution <= '0';
                timeout_counter_resetn <= '0';
                power_on_complete_i <    = '1';
            else
                pmu_current_state <= pmu_next_state;
            end if;
        end if;
    end process;
```

The pmu_state_proc is a process that, upon an out-of-bounds violation being detected (out_of_bound='1'), the current state of the PMU's instruction interpreter is set to IDLE (pmu_current_state<=pmu_idle), the external address is set to all zeros (r_ext_int_address<=(others=>'0')), external execution (i.e. execution of external programs) is disabled (external_execution<='0'), the timer counter is reset (timeout_counter_resetn<='0'), and the power on complete signal is set to say that the boot sequence has completed (power_on_complete_i<='1'). If an out-of-bound violation has not been detected then the PMU's instruction interpreter is driven to the next state to continue operating as normal.

It will be evident to a person of skill in the art that this is an example only and the transition logic 310 may be configured to transition an electronic device 100 to a predetermined safe state in other ways and/or using other logic or signals.

Once the transition logic 310 has caused the electronic device 100 to transition to a predetermined safe state the method 400 proceeds back to block 402 where the out-of-bounds fetch detection logic 320 continues to monitor the control and/or data signals.

It will be evident to a person of skill in the art that the above method is an example only and the blocks of the method may be executed in another order and some of the blocks may be omitted entirely. For example, in other examples blocks 410 and 412 may be omitted entirely and the method may proceed directly from block 408 to block 414.

Block 402 generally corresponds to block 202 of FIG. 2, blocks 404 to 410 generally correspond to block 204 of FIG. 2, and blocks 412 and 414 generally correspond to block 206 of FIG. 2.

The out-of-bounds recovery circuits of FIGS. 1 and 3 are shown as comprising a number of functional blocks. This is schematic only and is not intended to define a strict division between different logic elements of such entities. Each functional block may be provided in any suitable manner. It is to be understood that intermediate values described herein as being formed by an out-of-bounds recovery circuit need not be physically generated by the out-of-bounds recovery circuit at any point and may merely represent logical values which conveniently describe the processing performed by the out-of-bounds recovery circuit between its input and output.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A hardware design, which also may be referred to herein as an integrated circuit definition data set, describes an integrated circuit. The hardware design may be implemented in software, such as HDL (hardware description language). Accordingly, there may be provided a computer readable storage medium having encoded thereon computer readable program code in the form of an integrated circuit definition dataset (e.g. hardware design) that when processed in an integrated circuit manufacturing system configures the system to manufacture an out-of-bounds recovery circuit.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an out-of-bounds recovery circuit will now be described with respect to FIG. 5.

Figure 5:
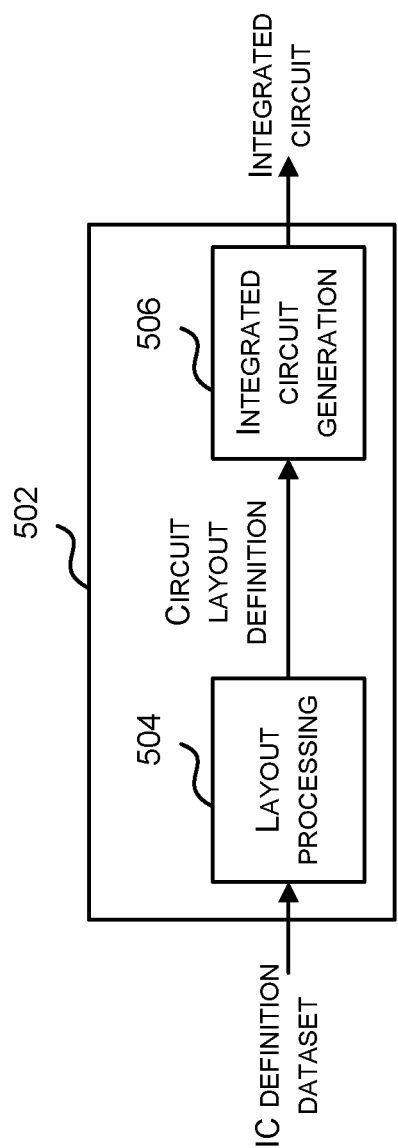
FIG. 5 is a block diagram of an example integrated circuit manufacturing system.

FIG. 5 shows an example of an integrated circuit (IC) manufacturing system 502 which comprises a layout processing system 504 and an integrated circuit generation system 506. The IC manufacturing system 502 is configured to receive an IC definition dataset (e.g. a defining an out-of-bounds recovery circuit as described in any of the examples herein), process the IC definition dataset, and generate an IC according to the IC definition dataset (which embodies an out-of-bounds recovery circuit as described in any of the examples herein). The processing of the IC definition dataset configures the IC manufacturing system 502 to manufacture an integrated circuit embodying an out-of-bounds recovery circuit as described in any of the examples herein.

The layout processing system 504 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 504 has determined the circuit layout it may output a circuit layout definition to the IC generation system 506. A circuit layout definition may be, for example, a circuit layout description.

The IC generation system 506 generates an IC according to the circuit layout definition, as is known in the art. For example, the IC generation system 506 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 506 may be in the form of computer-readable code which the IC generation system 506 can use to form a suitable mask for use in generating an IC.

The different processes performed by the IC manufacturing system 502 may be implemented all in one location, e.g. by one party. Alternatively, the IC manufacturing system 502 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an out-of-bounds recovery circuit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a an out-of-bounds recovery circuit having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 5 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 5, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. An out-of-bounds recovery circuit for an electronic device operable in a boot operating state and a normal operating state, each such operating state having non-allowable memory addresses, the out-of-bounds recovery circuit comprising:
    detection logic configured to:
        monitor one or more control and/or data signals of the electronic device including a signal indicating whether a power on sequence is complete;
        determine that a current operating state of the electronic device is the boot operating state when the power on sequence is not complete;
        determine that the current operating state of the electronic device is the normal operating state when the power on sequence is complete; and
        detect an out-of-bounds violation in the electronic device, when the detection logic determines, based on the one or more control and/or data signals of the electronic device, a processing element of the electronic device has fetched an instruction from a non-allowable memory address for the current operating state of the electronic device; and
    transition logic configured to, in response to the detection logic detecting an out-of-bounds violation, cause the electronic device to transition to a predetermined safe state.

2. The out-of-bounds recovery circuit of claim 1, wherein the one or more control and/or data signals includes a signal indicating a current value of a program counter of the processing element, and the detection logic is configured to determine the processing element has fetched an instruction from a non-allowable memory address for the current operating state of the electronic device when the current value of the program counter does not fall within at least one allowable memory address range for the current operating state of the electronic device.

3. The out-of-bounds recovery circuit of claim 1, wherein the current operating state is a boot operating state in which the electronic device executes boot firmware.

4. The out-of-bounds recovery circuit of claim 1, wherein each operating state is associated with one or more allowable memory address ranges.

5. The out-of-bounds recovery circuit of claim 4, wherein the detection logic comprises address range generator logic configured to identify the one or more allowable memory address ranges associated with each operating state.

6. The out-of-bounds recovery circuit of claim 1, wherein the detection logic comprises an out-of-bounds violation detected register, and the detection logic is configured to, in response to detecting an out-of-bounds violation, set the out-of-bounds violation detected register; and the transition logic is configured to determine that the detection logic has detected an out-of-bounds violation based on the out-of-bounds violation detected register.

7. The out-of-bounds recovery circuit of claim 1, wherein the detection logic is configured to, in response to detecting an out-of-bounds violation, generate a signal indicating that the detection logic has detected an out-of-bounds violation, and the transition logic is configured to determine whether the detection logic has detected an out-of-bounds violation based on the generated signal.

8. The out-of-bounds recovery circuit of claim 1, wherein the transition logic is configured to cause the electronic device to transition to the predetermined safe state by setting the state of the processing element to a particular state.

9. The out-of-bounds recovery circuit of claim 8, wherein the particular state is an idle state.

10. The out-of-bounds recovery circuit of claim 1, wherein the transition logic is configured to cause the electronic device to transition to a predetermined safe state by invoking an interrupt.

11. The out-of-bounds recovery circuit of claim 1, wherein the transition logic is further configured to, in response to the detection logic detecting an out-of-bounds violation, invalidate the fetched instruction so that the processing element does not execute the instruction fetched from the non-allowable memory address.

12. The out-of-bounds recovery circuit of claim 1, wherein the out-of-bounds recovery circuit is embodied in hardware on an integrated circuit.

13. An electronic device comprising a processing element and the out-of-bounds recovery circuit as set forth in claim 1.

14. A non-transitory computer readable storage medium having stored thereon a computer readable description of an integrated circuit that, when processed in an integrated circuit manufacturing system, causes the integrated circuit manufacturing system to manufacture the out-of-bounds recovery circuit as set forth in claim 1.

15. A method of recovering an electronic device from an out-of-bounds violation, the electronic device operable in a boot operating state and a normal operating state, each such operating state having non-allowable memory addresses, the method comprising:
    monitoring, by an out-of-bounds recovery circuit, one or more control and/or data signals of the electronic device including a signal indicating whether a power on sequence is complete;
    determining that a current operating state of the electronic device is the boot operating state when the power on sequence is not complete;
    determining that the current operating state of the electronic device is the normal operating state when the power on sequence is complete;
    detecting, by the out-of-bounds recovery circuit, an out-of-bounds violation in the electronic device when it is determined, from the one or more control and/or data signals of the electronic device, that a processing element of the electronic device has fetched an instruction from a non-allowable memory address for the current operating state of the electronic device; and
    in response to detecting an out-of-bounds violation, causing, by the out-of-bounds recovery circuit, the electronic device to transition to a predetermined safe state.

16. The method of claim 15, wherein the one or more control and/or data signals includes a signal indicating a current value of a program counter of the processing element, and it is determined that the processing element has fetched an instruction from a non-allowable memory address for the current operating state of the electronic device when the current value of the program counter does not fall within at least one allowable memory address range for the current operating state of the electronic device.

17. A non-transitory computer readable storage medium having stored thereon computer readable instructions that, when executed at a computer system, cause the computer system to perform a method comprising:
    monitoring one or more control and/or data signals of an electronic device including a signal indicating whether a power on sequence is complete, the electronic device operable in a boot operating state and a normal operating state, each such operating state having non-allowable memory addresses;
    determining that a current operating state of the electronic device is the boot operating state when the power on sequence is not complete;
    determining that the current operating state of the electronic device is the normal operating state when the power on sequence is complete;
    detecting an out-of-bounds violation in the electronic device when it is determined, from the one or more control and/or data signals of the electronic device, that a processing element of the electronic device has fetched an instruction from a non-allowable memory address for the current operating state of the electronic device; and
    in response to detecting an out-of-bounds violation, causing the electronic device to transition to a predetermined safe state.

* * * * *